United States Patent [19]

Thoren

[11] Patent Number: 4,902,144
[45] Date of Patent: Feb. 20, 1990

[54] TURBOCHARGER BEARING ASSEMBLY

[75] Inventor: Dennis F. Thoren, Garden Grove, Calif.

[73] Assignee: Allied-Signal, Inc., Morris County, N.J.

[21] Appl. No.: 345,990

[22] Filed: May 2, 1989

[51] Int. Cl.⁴ .............................................. F16C 17/18
[52] U.S. Cl. ..................................... 384/398; 384/99; 384/287; 384/551; 384/901
[58] Field of Search ................. 384/398, 99, 901, 287, 384/399, 369, 551

[56] References Cited

U.S. PATENT DOCUMENTS

| | | |
|---|---|---|
| 3,390,926 | 7/1968 | Woollenweber .................... 384/287 |
| 4,358,253 | 11/1982 | Okano et al. ......................... 384/398 |
| 4,364,717 | 12/1982 | Schippers et al. . | |
| 4,427,309 | 6/1984 | Blake . | |
| 4,605,316 | 8/1986 | Utecht .................................. 384/99 |
| 4,738,548 | 4/1988 | Zloch et al. ......................... 384/901 |

FOREIGN PATENT DOCUMENTS 2061393  6/1972  Fed. Rep. of Germany .

*Primary Examiner*—Lenard A. Footland
*Attorney, Agent, or Firm*—Kelly, Bauersfeld & Lowry

[57] ABSTRACT

An improved bearing assembly is provided for axially retaining journal bearings in a turbocharger. The turbocharger includes a center housing having an elongated bearing bore for receiving an axially spaced pair of journal bearings which in turn support a rotatable turbocharger shaft. Lubricating oil is supplied through the center housing for passage to the shaft-bearing interface through radially open oil flow ports formed in the journal bearings. A bearing spacer is interposed axially between the journal bearings such that the opposite ends of the bearing spacer define a pair of thrust surfaces for engaging and locating the axially inboard faces of the journal bearings. Additional thrust surfaces are formed on thrust members carried by the turbocharger shaft to engage and locate the axially outboard faces of the journal bearings. The outer diameters of these thrust surfaces are less than the outer diameter of the journal bearings to promote substantially unimpeded, axially bidirectional oil flow over and about the journal bearings.

11 Claims, 2 Drawing Sheets

TURBOCHARGER BEARING ASSEMBLY

BACKGROUND OF THE INVENTION

This invention relates generally to improvements in shaft bearings and related bearing mounting arrangements particularly for use in turbochargers and the like. More specifically, this invention relates to an improved turbocharger bearing assembly having relatively simple and easily assembled means for axially retaining a pair of journal bearings, while providing enhanced oil flow over and about journal bearing surfaces.

Turbochargers in general are well known in the art for supplying relatively high pressure air, commonly referred to as charge air, to the intake manifold of an internal combustion engine such as a reciprocating piston engine of the type commonly used to power automobiles, trucks, buses and the like. Typically, the turbocharger comprises a turbine housing connected for receiving exhaust gases expelled from the engine and configured to guide those exhaust gases into driving communication with a rotatable turbine wheel. The turbine wheel is carried on a rotatable shaft which extends through a center housing having shaft bearing components and supports a compressor impeller within a compressor housing. The turbine wheel thus rotatably drives the impeller, which in turn draws ambient air into the compressor housing for compression and discharge in the form of charge air for supply to the intake manifold of the engine. In this regard, turbochargers function to supply the engine with an increased mass flow of air to permit engine operation at substantially increased levels of performance and power output.

The rotating shaft in a modern turbocharger is normally designed for relatively high rotational speeds, such as on the order of 100,000 rpm or more. Such rotational speeds require the use of precision bearing components together with an effective system of bearing lubrication. In this regard, lubricating oil is commonly pumped under pressure through a center housing for contact with turbocharger journal and thrust bearings to prevent excessive bearing heating and wear.

In the past, significant design effort has been directed toward improvements in turbocharger bearing design. Such design efforts have been particularly directed toward reducing wear and/or audible noise attributable primarily to high frequency radial shaft excursions caused by unbalanced rotating components. See, for example, the turbocharger journal bearings described in U.S. Pat. Nos. 3,058,787 and 4,427,309. However, these prior bearing designs have generally relied upon conventional retaining rings to axially position and retain sleeve type journal bearings on a turbocharger shaft. Unfortunately, the use of such retaining rings requires precision ring grooves to be formed in the turbocharger center housing, and further requires tedious assembly steps to insure proper placement and seating of the retaining rings.

Alternative turbocharger bearing arrangements have been proposed in attempts to eliminate the use of conventional retaining rings and the complex manufacturing steps associated therewith. For example, cylindrical bearing spacers have been suggested for installation axially between a pair of journal bearings. The opposite ends of the bearing spacers are intended to cooperate with enlarged shoulders or other thrust surfaces on the turbocharger to achieve precision axial retention of the journal bearings, for example, U.S. Pat. Nos. 4,358,253 and 4,364,717. See also German Publication No. 2,061,393. However, these prior concepts utilizing a central bearing spacer have not provided adequate oil flow over and about the inner and outer diameter surfaces of the journal bearings. Accordingly, although the central bearing spacer has permitted elimination of standard retaining rings, relatively premature journal bearing failure attributable to inadequate lubrication has occurred. Such bearing spacer arrangements, therefore, have not achieved any significant commercial acceptance.

The present invention overcomes the problems and disadvantages encountered in the prior art by providing an improved turbocharger bearing assembly of the type having a central bearing spacer for axially locating journal bearing components. The present invention provides a particular combination of journal bearing and thrust surface geometries for promoting adequate flow of lubricating oil over and about the journal bearing surfaces.

SUMMARY OF THE INVENTION

In accordance with the invention, an improved turbocharger bearing assembly is provided for precision axial location and retention of journal bearings in a turbocharger. The bearing assembly comprises a combination of bearing components adapted for relatively simple yet precise assembly, without requiring the use of conventional bearing retaining rings and the various manufacturing and assembly steps associated therewith.

In general terms, the improved turbocharger bearing assembly comprises a turbocharger center housing having an elongated bearing bore formed therein. A pair of axially spaced, rotationally floating journal bearings are positioned within the bearing bore for rotatably supporting a turbocharger shaft which in turn carries a turbine wheel and a compressor impeller. Oil supply means provides lubricating oil to axially centered regions of the journal bearings. Portions of the oil flow pass respectively over the outer diameter surfaces of the journal bearings and through radially open oil flow ports formed in the journal bearings to lubricate the shaft-bearing interface.

The pair of journal bearings are maintained in precision axial separation by a generally cylindrical bearing spacer positioned about the turbocharger shaft and having inner and outer diameter surfaces with effectively substantial clearance with the shaft and the bearing bore, respectively. In the preferred form, pilot tabs project outwardly from the exterior of the bearing spacer to pilot the spacer for rotational floating within the bearing bore. The opposite ends of the bearing spacer define inboard thrust to surfaces for engaging and locating the axially inboard faces of the journal bearings. Outboard thrust surfaces are formed on thrust members carried by the turbocharger shaft to engage and locate the axially outboard faces of the journal bearings. In the preferred form, these outboard thrust surfaces are defined by a stepped shoulder at the turbine end of the shaft, and by a thrust collar of a thrust bearing unit at the compressor end of the shaft. The outer diameters of these inboard and outboard thrust surfaces are less than the outer diameter of the journal bearings, to promote substantially unimpeded and axially bidirectional oil flow over the surfaces of the journal bearings. In this regard, the pilot tabs on the bearing spacer are relatively narrow in arcuate width to minimize oil flow disruption. A central outlet in the spacer sleeve permits oil therein to flow freely to an appropriate sump.

Other features and advantages of the present invention will become more apparent from the following detailed description, taken in conjunction with the accompanying drawings which illustrate, by way of example, the principals of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
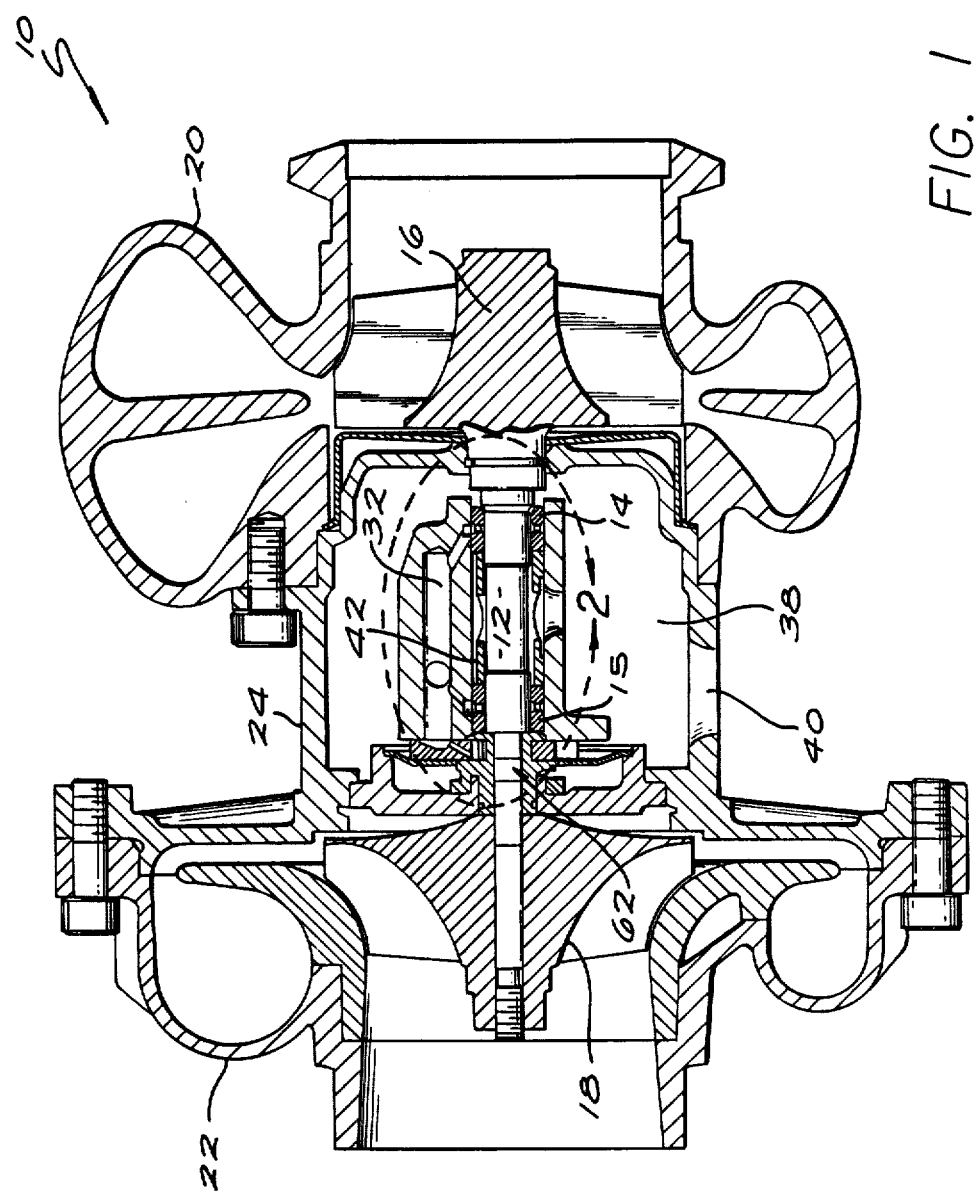
FIG. 1 is a longitudinal vertical section of a turbocharger including a bearing assembly embodying the novel features of the invention.

As shown in the exemplary drawings, a turbocharger referred to generally in FIG. 1 by the reference numeral 10 includes an improved bearing arrangement for rotatably supporting a turbocharger shaft 12. The bearing arrangement comprises a pair of journal bearings 14 and 15 which are axially located and retained by a relatively easily assembled combination of axially presented thrust surfaces. The arrangement of thrust surfaces is particularly designed to accommodate sufficient and axially bidirectional oil flow over and about the surfaces of the journal bearings 14 and 15.

In general, the illustrative turbocharger 10 depicted in FIG. 1 includes conventional turbocharger components for compressing ambient air supplied to an internal combustion engine (not shown). More particularly, the turbocharger shaft 12 rotatably supports and is connected between a turbine wheel 16 and a compressor impeller 18. The turbine wheel is disposed within a turbine housing 20 through which exhaust gases expelled from an internal combustion engine flow in driving relation with the turbine wheel. The turbine wheel 16 thus rotatably drives the compressor impeller 18 which is mounted within a compressor housing 22. Rotation of the impeller 18 draws ambient air into the compressor housing 22 for compression and supply to the intake manifold of the engine, thereby providing increased mass flow through the engine for increased performance and power output. To achieve a compact turbocharger assembly, the turbine and compressor housings 20 and 22 are mounted onto the opposite ends of a center housing 24 having appropriate bearing components for locating and rotatably supporting the turbocharger shaft 12.

In accordance with the invention, the improved turbocharger bearing assembly includes means for precision location and retention of the journal bearings 14 and 15. Importantly, the improved bearing retention means comprises relatively simple components adapted for rapid yet accurate assembly to reduce the overall manufacturing complexity and cost of the turbocharger. Moreover, the bearing components are designed for enhanced bearing oil flow to achieve prolonged bearing life with minimal heating and wear. These advantages are obtained without utilizing conventional bearing retaining rings or the relatively complex manufacturing process and assembly steps associated therewith.

Figure 2:
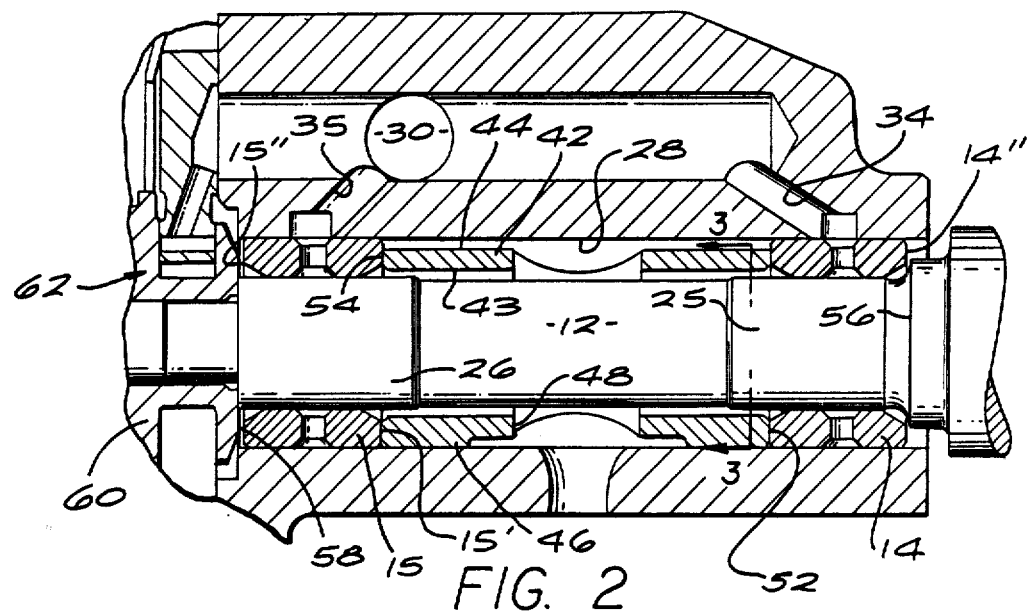
FIG. 2 is an enlarged fragmented sectional view corresponding with the encircled region 2 of FIG. 1.
Figure 4:
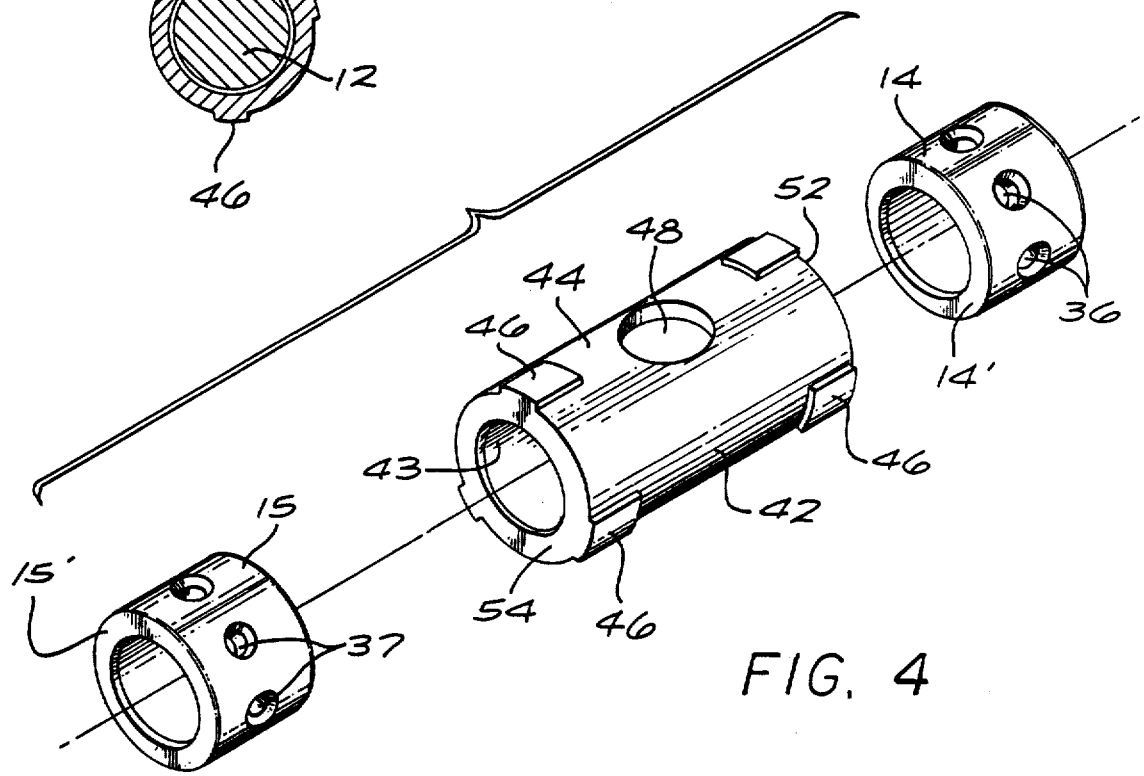
FIG. 4 is an exploded perspective view illustrating components of the bearing assembly.

As shown in more detail in FIGS. 2 and 4, the journal bearings 14 and 15 have a generally conventional sleeve bearing construction which can be formed by various manufacturing techniques utilizing a variety of known bearing materials, such as leaded or unleaded bronze, aluminum, etc. The journal bearings 14 and 15 have inner diameter surfaces sized to fit with relatively close clearance about cylindrical bearing lands 25 and 26 on the turbocharger shaft 12. In addition, the journal bearings 14 and 15 include outer diameter surfaces sized to fit with relatively close clearance within an axially elongated bearing bore 28 formed within the center housing 24. In the preferred form, the bearing bore 28 has a uniform diametric size to permit simple slide-in reception of the journal bearings, which are sized in turn for rotational floating within the bearing bore 28 during rotation of the shaft 12.

Lubricating oil is supplied through the center housing 24 to lubricate the bearing surfaces within and about the turbocharger bearings. More specifically, the center housing 24 includes an oil inlet port 30 through which oil under pressure is pumped to an elongated gallery passage 32. From the oil gallery 32, the oil passes further through individual bearing supply ports 34 and 35 for lubricating the journal bearings 14 and 15. As shown in FIG. 2, these supply ports 34 and 35 open at generally axially centered positions with respect to the two journal bearings, such that oil flow may occur axially in both directions to lubricate bearing surfaces. Some of this oil flow passes bidirectionally over the outer diameter surfaces of the journal bearings, whereas additional oil flow passes through circumferentially spaced arrays of radially open oil flow ports 36 and 37 to lubricate the interface between the bearings and the rotatable shaft 12. Oil flowing over and through the journal bearings 14 and 15 is eventually collected within a center housing sump chamber 38 (FIG. 1) for return circulation through an outlet port 40, as is known in the art.

Figure 3:
FIG. 3 is a transverse vertical section taken generally on the line 3—3 of FIG. 2.

The journal bearings 14 and 15 are maintained in precise axial separation by a generally cylindrical bearing spacer 42 mounted about the turbocharger shaft 12. This bearing spacer has an inner diameter surface 43 and an outer diameter surface 44 sized for effectively substantial clearance relative to the turbocharger shaft 12 and the bearing bore 28, respectively, to permit substantially unimpeded oil flow from the journal bearings in the inboard direction. Importantly, however, the bearing spacer 42 in its preferred form includes radially outwardly projecting pilot tabs 46 disposed in circumferentially spaced relation about the spacer for coaxially retaining the spacer within the bearing bore for rotational floating operation. These pilot tabs 46, three of which are viewed in FIGS. 3 and 4 at each end of the bearing spacer 42, have relatively narrow arcuate widths to avoid significant restriction of oil flow over the outer diameter surface 44 of the sleeve. One or more large central output openings 48 in the bearing spacer 42 permits oil flow within the sleeve to pass radially through a bearing bore outlet 50 to the sump chamber 38.

The opposite ends of the bearing spacer 42 define axially presented inboard thrust surfaces 52 and 54 of annular shape for respectively engaging and locating the axially inboard faces 14, and 15, of the journal bearings 14 and 15. Accordingly, the spacer 42 provides a relatively simple component adapted to locate and retain the bearings 14 and 15 in precision spaced relation. In a preferred form, the spacer 42 can be constructed from a low cost plastic selected to withstand typical turbocharger operating temperature ranges.

The bearing spacer 42 cooperates with additional or outboard annular thrust surfaces associated with thrust members on or carried by the shaft 12 for axial retention of the journal bearings. More specifically, at the turbine end of center housing 24, this additional thrust surface is defined by an axially presented shoulder 56 formed as an integral step on the shaft 12. At the compressor end, the additional thrust surface is defined by an axially presented thrust face 58 on a thrust collar 60 of a conventional thrust bearing unit 62. The stepped shoulder 56 and the thrust face 58 thus cooperatively provide outboard end limits for respectively retaining and locating the outboard faces 14″ and 15″ of the two journal bearings. In this regard, as viewed in FIG. 2, the thrust bearing unit 62 functions in a known manner to fix the axial position of the turbocharger shaft 12 relative to the center housing 24, thereby also fixing the axial position of the stepped shoulder 56 at the turbine end of the center housing. The combined axial dimensions of the coaxially stacked journal bearings 14 and 15 with the bearing spacer 42 are chosen to provide at least some axial float clearance in the tolerance stack between the stepped shoulder 56 and the thrust face 58 to accommodate manufacturing tolerances, component thermal expansion, and the requisite oil flow.

In accordance with a primary aspect of the invention, the geometries of the various inboard and outboard thrust surfaces are tailored to retain the journal bearings yet ensure substantially unimpeded oil flow within and about the journal bearings. More specifically, as shown best in FIG. 2, the outer diameter surface 44 of the spacer 42 is formed on a diameter substantially less than the outer diameters of the journal bearings 14 and 15 and the pilot tabs 46. Similarly, the inner diameter 43 of the bearing spacer is formed on a diameter significantly greater than the inner diameter of the journal bearings. Accordingly, oil flow from the supply ports 34 and 35 is permitted to pass in an inboard direction over and within the journal bearings, substantially without restriction imposed by the spacer 42.

Similarly, at the outboard sides of the journal bearings, the stepped shoulder 56 and the thrust face 58 are configured with diametric sizes significantly less than the outer diameter of the journal bearings. With this configuration, oil flow over the bearings in an outboard direction is permitted to escape with minimal restriction to the sump chamber, thereby assuring relatively high oil flow. In addition, the limited diameter of these outboard thrust surfaces provides minimal restriction to outboard oil flow at the bearing/shaft interface, particularly in view of the axial tolerance or float clearance, as previously described. Accordingly, in the outboard direction, relatively high oil flow is also assured about and within the journal bearings.

The improved turbocharger bearing assembly of the present invention thus provides relatively simple bearing components which can be installed by simple slide mounting onto the turbocharger shaft and within the bearing bore, as part of the overall turbocharger assembly process. When the various components are assembled, the journal bearings 14 and 15 are located with axial precision on the turbocharger shaft 12, and restrained against significant axial travel by a combination of thrust surfaces which do not substantially impede bidirectional oil flow. Extended turbocharger life with minimal bearing heating and wear thus results.

A variety of further modifications and potential improvements to the improved bearing assembly will be apparent to those skilled in the art. For example, alternative bearing spacer geometries may be used with different pilot tab positions and/or shapes, provided pilot means are present for smooth rotational floating of the sleeve within the bearing bore in combination with substantially unimpeded oil flow to or through the sump chamber. As one example, full circle pilot tabs or rings can be formed about the bearing spacer at axial positions spaced inwardly from the ends of the spacer, provided appropriate oil flows paths past the journal bearings in inboard directions are present. Accordingly, no limitation on the invention is intended by way of the foregoing description and accompanying drawings, except as set forth in the appended claims.

What is claimed is:

1. A turbocharger bearing assembly for rotatably supporting a turbocharger shaft within a bearing bore formed in a turbocharger center housing, said assembly comprising:
   a pair of rotationally floating journal bearings within said bearing bore and rotationally supporting said shaft;
   a generally cylindrical, rotationally floating bearing spacer carried about said shaft and axially interposed between said journal bearings, said spacer having opposite ends defining a pair of axially outwardly presented inboard thrust surfaces for engaging axially inboard faces of said journal bearings to maintain said journal bearings in precision axial spaced relation; and
   a pair of axially inwardly presented outboard thrust surfaces defined by a pair of thrust members carried with said shaft for engaging axially outboard faces of said journal bearings;
   said inboard and outboard thrust surfaces having outer diameters substantially less than the outer diameters of said journal bearings.

2. The turbocharger bearing assembly of claim 1 wherein said spacer has an inner diameter substantially greater than the outer diameter of said shaft.

3. The turbocharger bearing assembly of claim 1 wherein said spacer has an effective outer diameter substantially less than the diametric size of said bearing bore, said spacer further including pilot means radiating outwardly from said spacer outer diameter for piloting said spacer within said bearing bore.

4. The turbocharger bearing assembly of claim 1 wherein said journal bearings each include a generally axially centered, circumferentially spaced array of radially open oil flow ports, and further including oil flow means for supply of oil flow through said center housing to said journal bearings at generally axially centered positions with respect to said journal bearings, wherein said inboard and outboard thrust surfaces accommodate substantially unimpeded bidirectional oil flow about said journal bearings.

5. The turbocharger bearing assembly of claim 4 wherein said spacer has at least one central outlet opening formed therein to permit radial escape of oil from the interior of said spacer.

6. The turbocharger bearing assembly of claim 1 further including means for fixing the axial spacing between said outboard thrust surfaces to provide at least some axial float of said journal bearings and said spacer disposed in coaxial stacked relation between said outboard thrust surfaces.

7. The turbocharger bearing assembly of claim 1 wherein said spacer is formed from a plastic material.

8. A turbocharger bearing assembly for rotatably supporting a turbocharger shaft within a bearing bore formed in a turbocharger center housing, said assembly comprising:
 a pair of rotationally floating journal bearings within said bearing bore and rotationally supporting said shaft;
 a generally cylindrical bearing spacer carried about said shaft for rotational floating within said bearing bore and disposed axially between said journal bearings, said spacer having an inner diameter surface and an outer diameter surface disposed in substantial clearance with respect to said shaft and bearing bore, respectively, and pilot means radiating outwardly from said outer diameter surface for rotationally piloting said spacer within said bearing bore;
 said spacer having opposite ends defining a pair of axially outwardly presented inboard thrust surfaces for engaging axially inboard faces of said journal bearings to maintain said journal bearings in precision axial spaced relation, said inboard thrust surfaces having an effective outer diameter substantially less than the outer diameters of said journal bearings;
 a pair of thrust members carried by said shaft and defining a pair of axially inwardly presented outboard thrust surfaces for engaging axially outboard faces of said journal bearings, said outboard thrust surfaces having an outer diameter substantially less than the outer diameters of said journal bearings;
 means for fixing the axial spacing between said outboard thrust surfaces to provide at least some axial float for said journal bearings and said spacer sleeve; and
 oil flow means for supplying lubricating oil to said journal bearings at generally axially centered positions with respect to said journal bearings, said journal bearings including circumferentially spaced arrays of radially open oil flow ports to permit oil flow to the interface between said bearings and the shaft;
 said spacer further defining a central outlet opening to permit radial escape of oil to the exterior of said spacer.

9. The turbocharger bearing assembly of claim 8 wherein said bearing bore has a substantially uniform diametric size extending the length thereof.

10. The turbocharger bearing assembly of claim 8 wherein said pilot means comprises a circumferentially spaced array of arcuately narrow pilot tabs formed generally adjacent each end of said spacer.

11. The turbocharger bearing assembly of claim 8 wherein said thrust members respectively comprise a stepped shoulder on said shaft and a thrust bearing unit mounted on said shaft.

* * * * *